3,824,144
METHOD OF IMPULSE WELDING LAYERS OF PLASTIC MATERIAL
Frank Bosse, Ibbenburen-Dorenthe, Germany, assignor to Windmoller & Holscher, Lengerich, Westphalia, Germany
Filed Oct. 19, 1971, Ser. No. 190,644
Claims priority, application Germany, Oct. 22, 1970, P 20 51 997.5
Int. Cl. B32b 31/20; C09j 5/00
U.S. Cl. 156—306
2 Claims

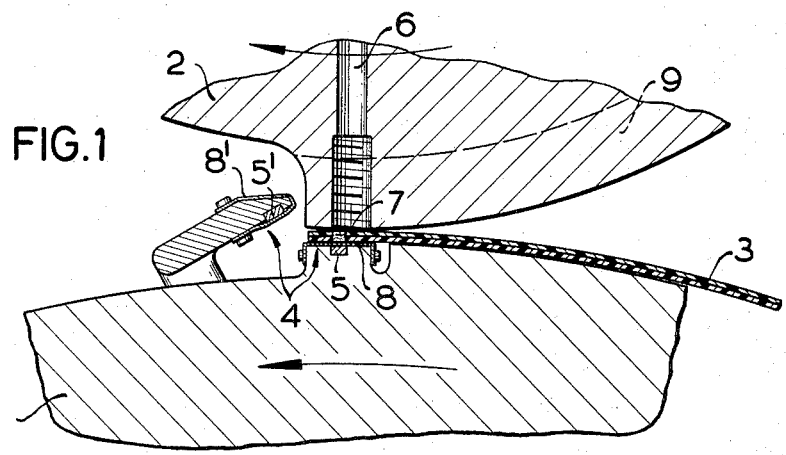
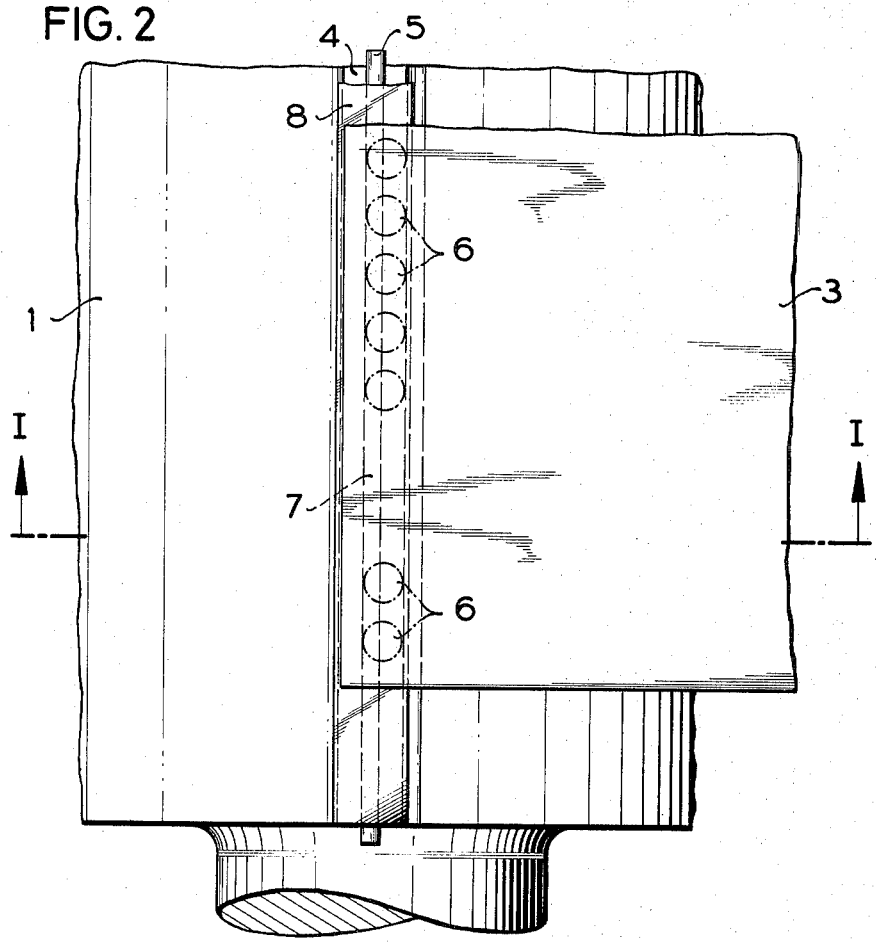

ABSTRACT OF THE DISCLOSURE

A method of welding layers of plastics bag material in which heat is applied to welding jaws in impulses, the welded portion being removed from the jaws before the weld has solidified, preferably after termination of each heat impulse and within a time equal to the duration of one impulse. In apparatus for performing this method, one of a pair of welding jaws is controlled to open and close by a cam designed so that said one jaw remains closed for no longer than twice the duration of one impulse. Suction means may be employed to facilitate removal of each welded bag from the jaw that is not cam-controlled.

---

The invention relates to a method and apparatus for welding layers of plastics film in the manufacture of bags or sacks by heating the layers above their melting point between impulse-heated welding jaws.

A so called heat-impulse welding method is described in U.S. Pat. 2,460,460. The plastics layers to be welded are gripped between two welding jaws of which at least one jaw carries a heating strip which is heated for a short period by means of an electric current impulse so that the regions of the plastics layers that are to be joined by a weld seam are heated to the welding temperature, whereafter the jaws remain closed until the weld seam has solidified. The intention is that, subsequent to the heat impulse welding step, cooling and solidfication of the weld seam is to take place between the compressed welding jaws.

The heat-impulse welding process is an improvement on the at that time conventional use of permanently heated heating elements in the welding jaws not only because permanently heated jaws require more energy but also because the exhibit considerable inertia to changes in their temperature, fluctuations in their temperature are difficult to control and their temperature is dependent on the number of welding steps performed per unit time, the nature of the plastics material being welded, the thickness of the plastics layers and other factors.

From the time of publication of the aforementioned U.S. patent up to the present day it has been an essential feature of the heat-impulse welding method that the welding jaws remain pressed against the weld seam even after termination of the current impulse until the weld seam has cooled and solidified. This fact is substantiated by the disclosures of the following subsequent patents, namely, U.S. Pat. Nos. 2,574,094, 2,574,095, 2,675,054, 2,682,294, 2,904,100, 2,908,320, 2,918,106, 3,015,601, 3,367,261, 3,369,954 and German Specifications 1,221,785 and 1,296,781.

Time and again it has been shown that disruptions in operation cannot be eliminated with certainty in the heat-impulse welding method, especially if the plastics films to be welded are of a sensitive nature. Although the welding jaws are covered with an anti-adhesion insulating material, the welded plastics layers may become stuck to the jaws during operation. During subsequent opening of the welding jaws, even the cooled welding seams may then become damaged and the proper welding of further plastics layers may be detrimentally influenced by the material that remains stuck to the jaws. Further, tight clamping of the plastics layers between the jaws during the cooling step prevents the plastics material from shrinking in the region of the welded seam, such shrinkage being desirable to produce homogeneous and strong weld seams. Still further, intensive cooling at the welding jaws gives rise to abrupt heat transfer in the marginal zones adjoining the weld seam; this sets up stresses which limit the resilient deformability of the plastics bag or sack being made. Yet another disadvantage is that the comparatively long time interval between welding and cooling and solidification of the seam while held between the compressed welding jaws makes it necessary that, in a continuous operation such as on a rotary welding cylinder, the layers and jaws must traverse a long path. The consequent increase in the diameter of the welding cylinder compared with welding cylinders having permanently heated welding jaws leads to higher costs in construction and operation and a larger space requirement.

In our German Specification 1,246,219 we have suggested that, after the current impulse is switched off, the welding jaws are opened so that the weld layers can be released from the lower welding jaw (which is the only jaw provided with a heating strip) by the pressure of cooling air introduced beneath a film of anti-adhesive insulating material that is loosely laid over the heating band. This enables rapid cooling of the weld seam and also permits shrinkage but the constructional costs are not inconsiderable, especially if the supply of cooling air is provided at a welding cylinder. Also, there is still a minimum length of path which the welded layers must travel despite the reduction in the cooling time.

The invention aims to provide a heat-impulse welding method and apparatus in which the above-mentioned disadvantages are avoided or at least alleviated. Ideally, there should be no adhesion between the plastics layers and the welding jaws so as to avoid damage to the weld seams during opening of the jaws or removal of the welded layers. Further, shrinkage of the fresh weld seams should be possible during cooling and there should be a gradual spreading of the weld heat into the marginal zones adjoining the weld seams so that residual stresses are avoided in the locality of the weld seam. Also, the welding apparatus should be compact and permit safe withdrawl of freshaly welded plstics bags from between the open welding jaws.

According to the invention, there is provided a method of welding layers of plastics film material in the production of bags or sacks, comprising heating the layers in electrically impulse-heated welding jaws to a temperature above the melting point of the plastics material, opening the jaws upon termination of the electric welding current, and removing the welded portion from the jaws before the weld has solidified. Preferably, opening of the jaws and removal of the welded portion is carried out after termination of the welding current within a time interval corresponding to the duration of the preceding welding impulse, i.e. usually within a time interval of 2/100 to 3/100 seconds.

The method of the present invention involving withdrawal of the welded portion while the latter is still liquid or substantially fluent is contrary to the previous teaching and ensures that the compressed plastics layers can always be readily released from the welding jaws because plastics in a fluent or almost fluent condition will not stick to the jaws as the latter are being opened. Contrary to the conventional heat-impulse welding method, cooling does not now take place while pressure is everted on the welded portion and therefore shrinkage is possible during cooling to result in a higher strength of the weld.

At the same time an abrupt heat transfer is avoided in the region of the welded portion in so far that there is no intensive cooling caused by closed welding jaws. In the absence of welding jaws pressing on the plastics layers during cooling, the weld heat spreads gradually and eliminates residual stresses in the vicinity of the welded portion. If a welding cylinder is used, its diameter is principally determined by the actual welding time and can therefore be kept quite small even if the bags being welded are relatively long. This brings about economical advantages because the welding apparatus will be compact.

In heat-impulse welding apparatus comprising a cam-controlled welding jaw for producing welded portions on plastics materials in the manufacture of bags or sacks, the present invention also contemplates the provision of a control cam having a first cam portion operative when the jaw is to be closed and a second cam portion operative when the jaw is to be open, the length of the first cam portion being such that the time of jaw closure is no longer than twice the impulse duration of the welding current impulses. Preferably, withdrawal of each bag from the open jaw is facilitated by the provision of suction orifices in the region of the welded portion, the suction orifices being advantageously disposed in a continuous row so that the welded portion is uniformly engaged during removal of the bag from the welding apparatus. The suction air assists in cooling of the welded portion and therefore avoids more intensive heating of the withdrawal means.

An example of the invention is illustrated in the accompanying diagrammatic drawing, wherein:

FIG. 1 is a fragmentary section through a welding apparatus taken on the line I—I in FIG. 2, and FIG. 2 is a plan view of the welding apparatus but omitting a withdrawal cylinder and movable welding jaw shown in FIG. 1.

The welding apparatus comprises a welding cylinder 1 and a withdrawal cylinder 2 which roll on one another. A plastics bag 3 is shown in the drawing as just about to be transferred to the withdrawal cylinder 2, a welding jaw 4 having been opened by a control cam (not shown) an electric current impulse for a heating strip 5 having been switched off immediately previously and suction orifices 6 being engaged with the bag 3. A weld seam 7 of the bag is still fluent or almost fluent and consequently separation of the plastics bag material from an anti-adhesive insulating film 8 laid over the heating strips 5 takes place without resistance. After cooling and simultaneous shrinkage of the welded material, the seam 7 is somewhat thicker and this contributes to an increased strength of the weld connection.

The control cam for the welding jaw 4 has a cam portion which is short enough to ensure that the time during which the jaws are closed terminates no later than expiry of a time interval corresponding to the duration of one weld impulse after termination of the welding impulses.

The suction orifices 6 are arranged in a row which extends over the entire length of the withdrawal cylinder 2 and which is interrupted only by annular grooves 9 for subsequent transfer by means of chain grippers. In the illustrated example, the orifices 6 are formed by radial holes which are formed in the withdrawal cylinder 2 and which are provided with a screwthread at their outer ends so that they can be readily closed by means of screws in order to adapt the row of orifices to the different widths of bag material that may be encountered.

Withdrawal of the weld seams from the welding jaws could in fact take place before the welding current is switched off. However, this would result in unnecessary power consumption and also endanger the heating elements which might burn out because they are no longer cooled by the plastics material and by the backing jaw after the jaws are open.

I claim:

1. A method of welding sheets of plastic material, particularly in the manufacture of bags or sacks, comprising placing said sheets between the welding jaws of a welding press, heating said sheets to a temperature above the melting point of said plastic material by applying an impulse of current through said welding jaws, opening said welding jaws upon termination of said impulse, and removing the welded portion of said plastic material from said welding jaws before the weld has solidified; said removal of the welded portion of said plastic material therefrom being effected within a time interval after termination of said impulse corresponding to the duration of said impulse.

2. A method of welding sheets of plastic material, particularly in the manufacture of bags or sacks, comprising placing said sheets between the welding jaws of a welding press, heating said sheets to a temperature above the melting point of said plastic material by applying an impulse of current through said welding jaws, opening said welding jaws, and removing the welded portion of said plastic material from said welding jaws before the weld has solidified, said opening of said welding jaws and said removal of the welded portion of said plastic material therefrom being effected within a time interval after termination of said impulse corresponding to the duration of said impulse.

References Cited

UNITED STATES PATENTS

| 3,056,712 | 10/1962 | Imhof | 156—306 |
| 3,408,478 | 10/1968 | Penn | 156—306 X |

FOREIGN PATENTS

| 1,246,219 | 8/1967 | West Germany. |

DANIEL J. FRITSCH, Primary Examiner

R. A. DAWSON, Assistant Examiner

U.S. Cl. X.R.

53—39; 156—582, 583